(12) United States Patent
Namuduri

(10) Patent No.: US 6,838,852 B1
(45) Date of Patent: Jan. 4, 2005

(54) PLUG AND PLAY ELECTRIC MACHINE

(75) Inventor: Chandra S. Namuduri, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/404,851

(22) Filed: Apr. 1, 2003

(51) Int. Cl.[7] .............................................. G05B 23/02
(52) U.S. Cl. ........................ 318/565; 318/685; 318/434; 318/567; 318/570
(58) Field of Search ................................. 318/565, 685, 318/434, 563, 567, 570, 569, 445; 600/16; 364/900

(56) References Cited

U.S. PATENT DOCUMENTS

| | | | |
|---|---|---|---|
| 4,779,031 A | * 10/1988 | Arends et al. ............... | 318/565 |
| 4,939,437 A | 7/1990 | Farag et al. | |
| 5,206,572 A | 4/1993 | Farag et al. | |
| 5,689,169 A | 11/1997 | Kerkman et al. | |
| 5,880,415 A | 3/1999 | Colby et al. | |
| 5,883,344 A | 3/1999 | Colby et al. | |
| 5,922,055 A | * 7/1999 | Shahar et al. ................. | 710/16 |
| 5,929,400 A | 7/1999 | Colby et al. | |
| 6,605,032 B2 | * 8/2003 | Benkowski et al. .......... | 600/16 |
| 6,642,684 B1 | * 11/2003 | Mirbach ..................... | 318/560 |
| 2003/0155081 A1 | * 8/2003 | Goodman et al. ....... | 160/84.02 |

* cited by examiner

*Primary Examiner*—Karen Masih
(74) *Attorney, Agent, or Firm*—Kathryn D. Marra

(57) ABSTRACT

A plug and play electric machine interfaces with a plug and play controller. A memory device stores configuration parameters for operating an electric machine that are accessed by the plug and play controller. A plug and play connector connects to the plug and play controller. A sensor monitors a property of the electric machine. A sensor connector communicates with the sensor and the plug and play controller. The configuration parameters are transmitted to the plug and play controller during a power-up sequence of the electric machine. The plug and play electric machine connects to different plug and play controllers. A power connector is associated with the electric machine and communicates with a power driver included in the plug and play controller. The plug and play connector, sensor connector, and power connector form an integrated connector. The plug and play controller updates the configuration parameters based on feedback from the sensor.

21 Claims, 3 Drawing Sheets

US 6,838,852 B1

PLUG AND PLAY ELECTRIC MACHINE

FIELD OF THE INVENTION

The present invention relates to vehicle electromechanical systems, and more particularly to plug and play electric machines for vehicle electromechanical systems.

BACKGROUND OF THE INVENTION

Vehicles are increasingly incorporating electric machines such as motors and generators to reduce weight, improve performance, and/or reduce cost. For example, power steering systems are increasingly being designed with electric motors. Future automobiles such as hybrid electric and fuel-cell vehicles are expected to use variable speed electric motor drives to improve fuel efficiency. Vehicles are capable of using different types of electric machines in a particular application. The electric machines that may be used can have different ratings and/or other operating parameters.

Typically, an electronic controller is used to control the electric machine. The electric machine and a machine controller are usually packaged separately due to concerns about thermal damage to the machine controller and other environmental factors that affect packaging. To achieve optimum performance, the machine controller must be configured to operate the electric machine. To be configured properly, the machine controller requires machine ratings, electrical and mechanical parameters, and/or other operating parameters for the electric machine. The ratings and/or operating parameters are usually entered into the machine controller memory manually. Without prior knowledge of the machine parameters, it may be necessary for the controller to be manually configured using trial and error. When the maximum ratings of the electric machine are not known, the maximum ratings can be exceeded when run from an improperly configured controller, which may cause damage.

As the vehicle ages, the electric machine may fail. The replacement electric machine may differ from the original electric machine in both its type and its electromagnetic/mechanical parameters. The ratings and/or other operating parameters stored in memory may no longer be valid. In this case, the configuration data stored in memory may have to be manually overwritten with new data by a qualified technician.

In one conventional approach, a computer uses steps programmed in memory to efficiently start a motor and to prevent overloading. The function is customized to work with different motors by storing the steps necessary for each motor in memory. A library is composed of different motor configurations. The programs are loaded when one of the motors is used. However, the programs need to be manually loaded in the memory each time a new motor is used by providing information on the exact model of motor being used. In addition, the programs are not updated during operation to compensate for changes in the operation of the device.

SUMMARY OF THE INVENTION

A plug and play electric machine according to the present invention is capable of interfacing with a plug and play controller and includes an electric machine. A memory device stores a plurality of configuration parameters for operating the electric machine. A plug and play connector is adapted to be connected to the plug and play controller. The plurality of configuration parameters can be accessed by the plug and play controller.

In other features, a sensor monitors a property of the electric machine. A sensor connector communicates with the sensor and the plug and play controller. The plurality of configuration parameters is transmitted to the plug and play controller during a power-up sequence of the electric machine. The memory device includes nonvolatile memory. The memory device is mounted on a printed circuit board. The memory device is electrically and thermally isolated from the electric machine and is located in an environmentally sealed location. The plug and play electric machine is capable of connecting to different plug and play controllers.

In still other features of the invention, a power connector is associated with the electric machine. The power connector is capable of communicating with a power driver included in the plug and play controller. The plug and play connector, sensor connector, and power connector form an integrated connector. The plug and play controller updates the plurality of configuration parameters in the memory device based on feedback from the sensor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
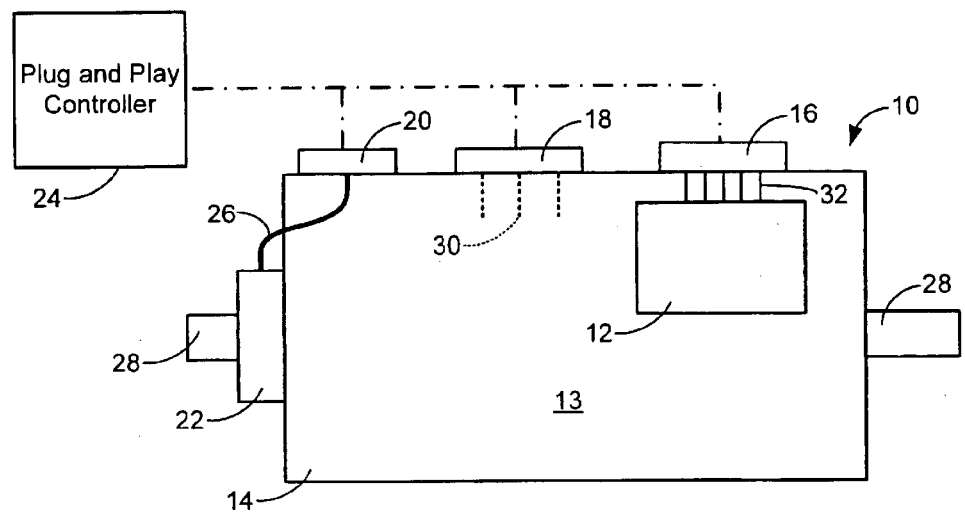
FIG. 1 is a plan view of a plug and play electric machine.

The following description of the preferred embodiment(s) is merely exemplary in nature and is in no way intended to limit the invention, its application, or uses. For purposes of clarity, the same reference numbers will be used in the drawings to identify similar elements.

Referring now to FIG. 1, an exemplary embodiment of a plug and play electric machine 10 is shown. As used herein, "electric machine" refers to a motor, generator, or other power generation or conversion device. A memory device 12 is attached to a frame or other structure 13 that is associated with an electric machine 14. The electric machine 10 also includes a plug and play connector 16, a power connector 18, and a sensor connector 20.

The sensor connector 20 communicates with one or more sensors 22 and a plug and play controller 24. The sensor 22 and sensor connector 20 are shown connected by a conductor 26. However, skilled artisans can appreciate that the devices can be connected in other ways such as using a wireless connection. The sensor 22 monitors a property of the electric machine 14. For example, in FIG. 1 a rotary sensor monitors rotation of a shaft 28 of the electric machine 14. Sensors could also be used to monitor machine winding currents, magnetic flux density, temperature, and other properties of the electric machine 14. The power connector 18 interfaces with a power driver that is associated with the plug and play controller 24. The power connector 18 receives a set of power pins 30.

The plug and play connector 16 communicates with the memory device 12 and is capable of communicating with the plug and play controller 24. The plug and play connector 16 and the memory device 12 are connected by a set of conductors 32 in FIG. 1, however other methods of communication such as wireless connections or integrated connections are contemplated. The memory device 12 stores several parameters of the electric machine 14 using programmable memory. The memory device 12 stores the parameters in a pre-defined standard format that can be read by the plug and play controller 24 during a power-up sequence of the electric machine 14. The memory device 12 can include any storage medium that can store data in a digital format. The data storage medium is preferably non-volatile memory. Exemplary storage mediums include integrated circuit flash Electrically Programmable Read-Only Memory (EPROM), Electrically Erasable PROM (EEPROM), Ferro-Electric Random Access Memory (FERAM), Nonvolatile RAM, and Magnetically or Optically coded ROM. The memory device 12 is preferably mounted on a printed circuit board.

The memory device 12 is environmentally sealed to protect the memory from water and dirt. The memory device 12 is preferably electrically and thermally isolated from the electric machine 14 to prevent heat or power generated by the electric machine 14 from adversely affecting the memory device 12. While the memory device 12 is shown attached to a frame 13 of the electric machine 14, the memory device 12 can be attached to the electric machine in other positions.

Figure 2:
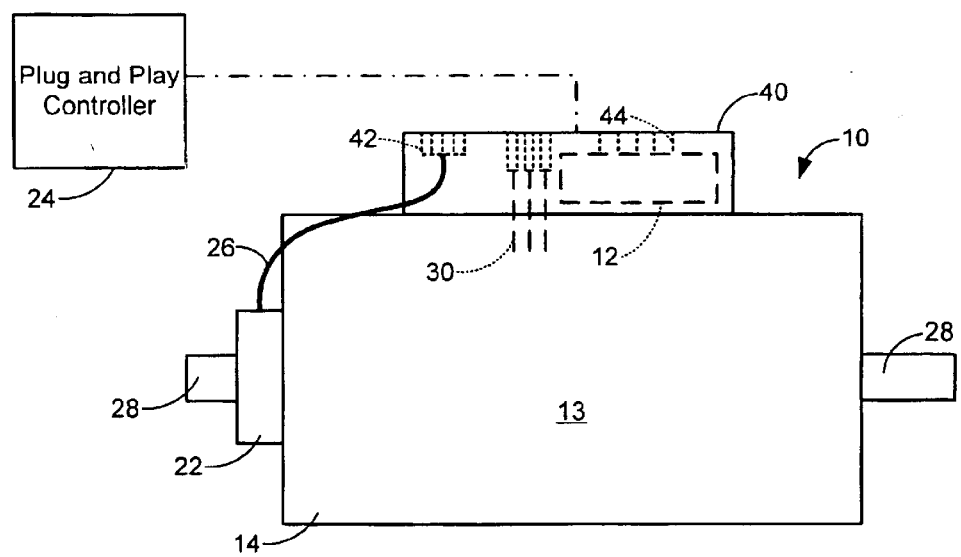
FIG. 2 is a plan view of a plug and play electric machine with an integrated connector.

Referring now to FIG. 2, another embodiment of the plug and play electric machine 10 is shown. The plug and play connector 16, power connector 18, sensor connector 20, and/or the memory device 12 are combined into an integrated connector 40. This arrangement simplifies the disassembly or reassembly process of the electric machine 14. In FIG. 2, the set of power pins 30 are recessed with respect to a set of sensor pins 42 for the sensor connector 20 and a set of plug and play pins 44 for the plug and play connector 16. This allows the plug and play controller 24 to first communicate with the memory device 12 and the sensor 22. Then, power is applied to the set of power pins 30. The plug and play controller 24 can access the set of parameters stored in the memory device 12 when the plug and play controller 24 communicates with the set of plug and play pins 44. The plug and play controller 24 can determine the status of the sensor 22 by communicating with the set of sensor pins 42.

While the present invention discloses a plug and play electric machine 10 for a vehicle, the discussed features can be incorporated into any electromagnetic, electromechanical, piezoelectric, and/or smart material-based actuator. The features are especially useful for an actuator that interfaces with a controller that requires information about the actuator properties for proper operation and maximization of performance under given operating conditions.

Figure 3:
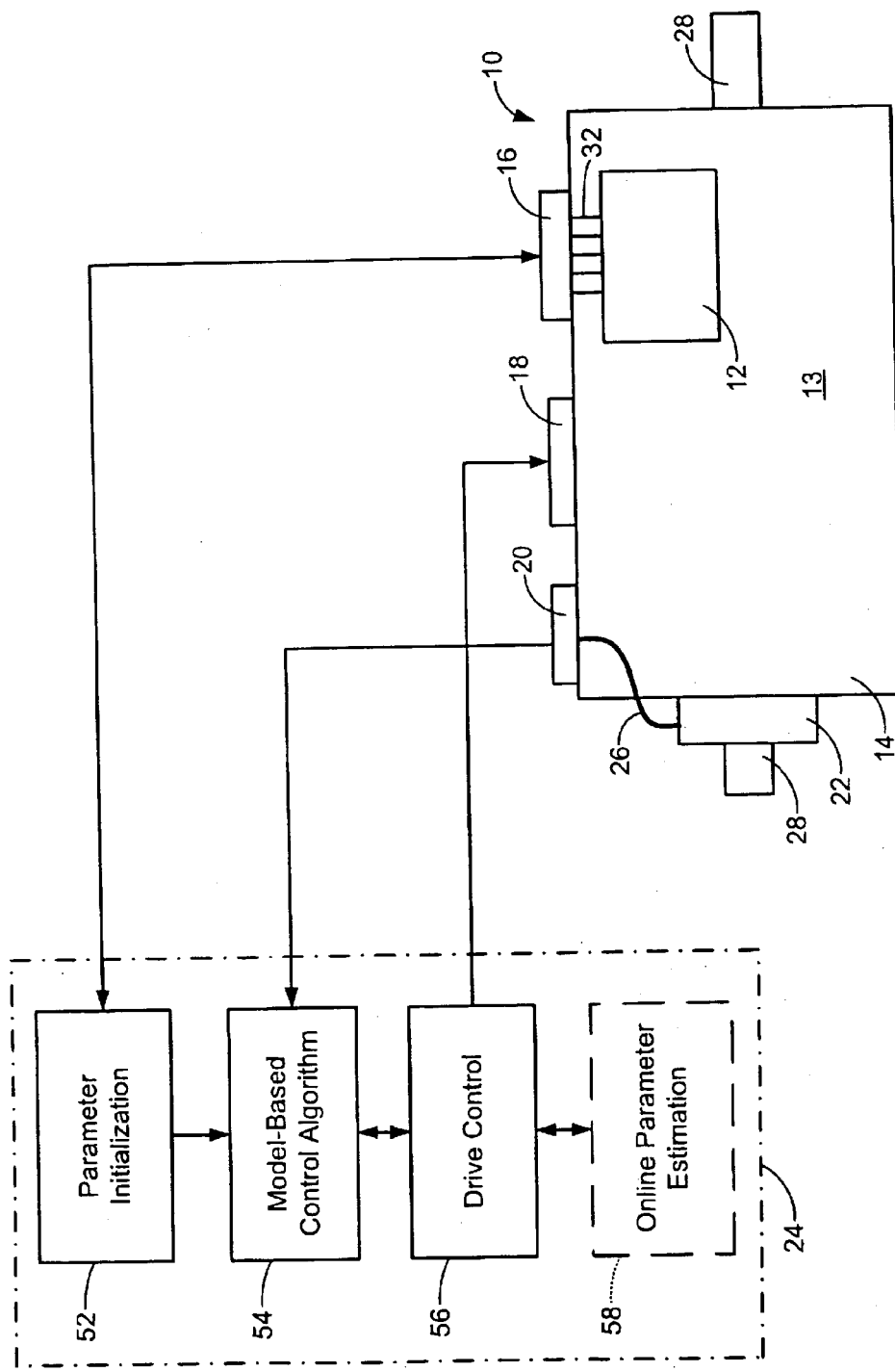
FIG. 3 is a functional block diagram illustrating the interfacing of an electric machine and a plug and play controller.

Referring now to FIG. 3, operation of the plug and play electric machine 10 and the plug and play controller 24 is illustrated. During a parameter initialization stage 52, the plug and play controller 24 accesses the set of parameters that are stored in the memory device 12 via the plug and play connector 16. This allows the plug and play controller 24 to initialize and determine the properties of the electric machine 14. During a model-based control algorithm stage 54, the plug and play controller 24 receives signals from the sensor 22 via the sensor connector 20. Based on the signals received from the sensor 22 and the knowledge of the set of parameters, the plug and play controller 24 drives the electric machine 14 via the power connector 18 during a drive control stage 56.

If the plug and play controller 24 includes an online parameter estimation stage 58, the plug and play controller 24 determines typical performance characteristics and data of the electric machine 14. Possible characteristics include torque, power vs. speed, efficiency vs. speed, and current. These characteristics can be stored in the memory device 12 by the plug and play controller 24 communicating with the plug and play connector 16. Additionally, non-linear behaviors of parameters can be included as functions of operating conditions in look-up tables. These behaviors, like the determined characteristics, can be stored in the memory device 12. This enables the parameters stored in the memory device 12 to be updated, making the electric machine 14 more efficient as it ages or is serviced. Storing the behaviors in the memory device 12 also avoids accidental misapplication of power as all operating limits are known.

Figure 4:
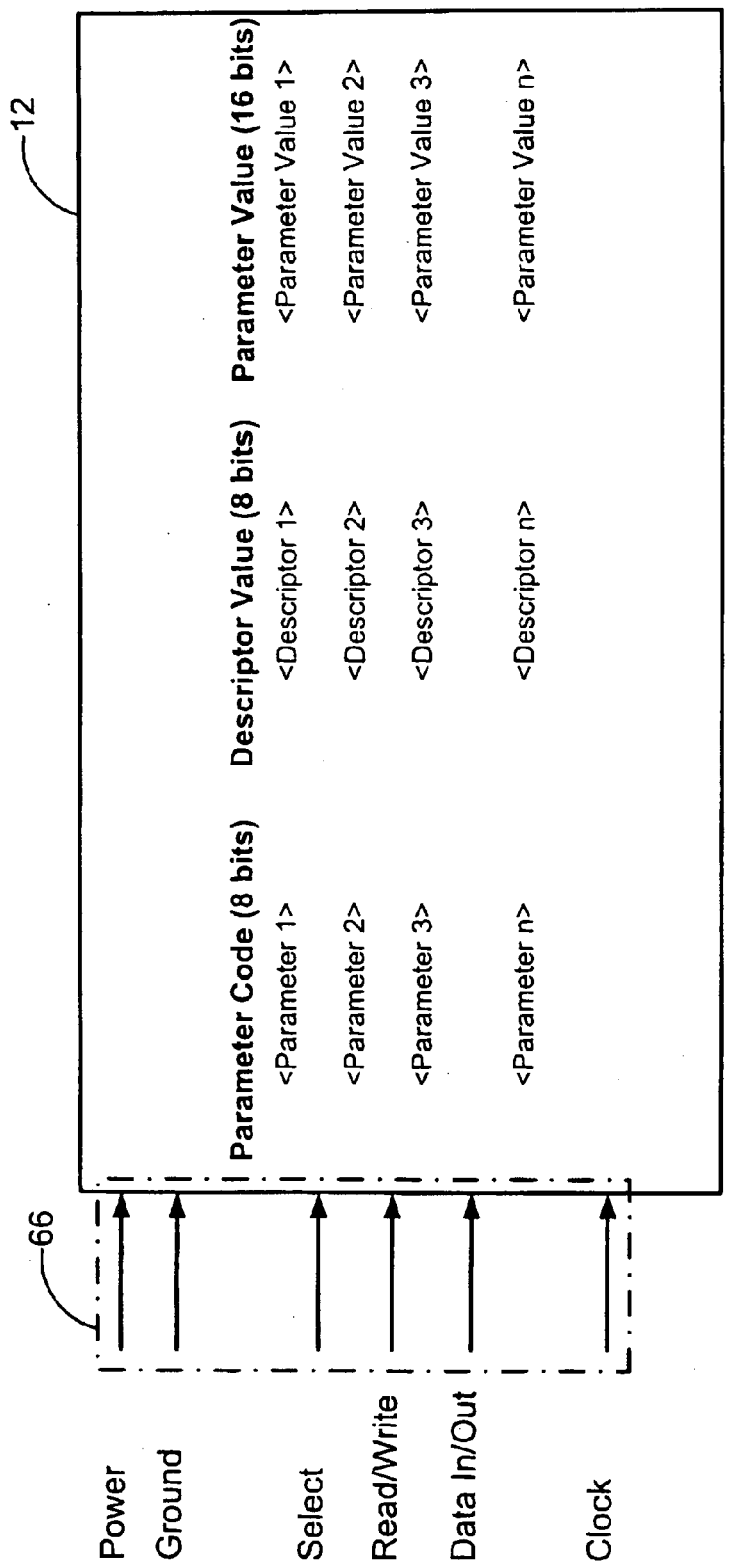
FIG. 4 illustrates an exemplary data storage format and typical interface signals used to communicate with a memory device.

Referring now to FIG. 4, an exemplary representation of the storage of electric machine 14 parameters is shown. The memory device 12 is shown as a nonvolatile memory unit with a three field format. Each parameter is represented by a parameter code, descriptor value, and parameter value. An exemplary set of interface signals 66 is also shown. The set of interface signals 66 is used for sending and receiving data to and from the plug and play controller 24. The set of interface signals 66 are accessed via the plug and play connector 16, and include Power, Ground, Select, Read/Write, Data In/Out, and Clock. This allows the set of parameters stored in the memory device 12 to be read as well as updated to reflect changes in the performance of the electric machine 14. As mentioned above, this can be done automatically by an online parameter estimation stage 58 in the plug and play controller 24. It is also possible for the set of parameters to be updated using a programming device such as a computer that can interface with the plug and play connector 16 to communicate with the memory device 12.

The present invention allows for smart electric machines and actuators that can carry their identification and characteristics and can be applied to various automotive, industrial, and manufacturing applications. This invention also allows for the development of smart adaptive controllers that can operate with a variety of electric machines and actuators. The self-configuration of a controller based on the parameters of the electric machine 14 enables a plug and play architecture. This invention also allows for the creation of standards for identifying electric machines and actuators with parameters stored in the memory device 12.

Moreover, the present invention simplifies installation or replacement of an electric drive system by eliminating necessary tuning of the electric machine 14 to a specific controller. This is especially useful when no written documentation is available for the electric machine 14. Therefore, the cost of servicing or replacing the electric machine 14 is minimized. This invention allows easier replacement and servicing of an electric machine or actuator. However, it also allows for easy replacement and servicing of a plug and play controller that works with the electric machine or actuator without the need for tuning or reconfiguring. This results in significantly less service time of electric drive systems used in electric, hybrid, and fuel cell based or other vehicles that depend on electric machines for propulsion and power generation.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A plug and play electric machine that is capable of interfacing with a plug and play controller, comprising:
    an electric machine;
    a memory device for storing a plurality of configuration parameters for operating said electric machine; and
    a plug and play connector that is adapted to be connected to said plug and play controller, wherein said plurality of configuration parameters can be accessed by said plug and play controller.

2. The plug and play electric machine of claim 1 further comprising:
    a sensor that monitors a property of said electric machine; and
    a sensor connector that communicates with said sensor and said plug and play controller.

3. The plug and play electric machine of claim 1 wherein said plurality of configuration parameters is transmitted to said plug and play controller during a power-up sequence of said electric machine.

4. The plug and play electric machine of claim 1 wherein said memory device includes nonvolatile memory.

5. The plug and play electric machine of claim 1 wherein said memory device is mounted on a printed circuit board.

6. The plug and play electric machine of claim 1 wherein said memory device is electrically and thermally isolated from said electric machine and is located in an environmentally sealed location.

7. The plug and play electric machine of claim 1 wherein said plug and play electric machine is capable of connecting to different plug and play controllers.

8. The plug and play electric machine of claim 3 further comprising:
    a power connector associated with said electric machine, wherein said power connector is capable of communicating with a power driver included in said plug and play controller.

9. The plug and play electric machine of claim 8 wherein said plug and play connector, said sensor connector, and said power connector form an integrated connector.

10. The plug and play electric machine of claim 2 wherein said plug and play controller updates said plurality of configuration parameters in said memory device based on feedback from said sensor.

11. A method for operating a plug and play electric machine that is capable of interfacing with a plug and play controller, comprising:
    providing an electric machine;
    providing a memory device;
    storing a plurality of configuration parameters for operating said electric machine in said memory device; and
    providing a plug and play connector that communicates with said memory device; and
    adapting said plug and play connector to connect to said plug and play controller, wherein said plurality of configuration parameters can be accessed by said plug and play controller.

12. The method of claim 11 further comprising:
    providing a sensor;
    monitoring a property of said electric machine with said sensor; and
    providing a sensor connector that communicates with said sensor and said plug and play controller.

13. The method of claim 11 further comprising:
    transmitting said plurality of configuration parameters to said plug and play controller during a power-up sequence of said electric machine.

14. The method of claim 11 wherein said memory device includes nonvolatile memory.

15. The method of claim 11 further comprising:
    mounting said memory device on a printed circuit board.

16. The method of claim 11 further comprising:
    isolating said memory device electrically and thermally from said electric machine; and
    locating said memory device in an environmentally sealed location.

17. The method of claim 11 wherein said plug and play electric machine is capable of connecting to different plug and play controllers.

18. The method of claim 13 further comprising:
    providing a power connector associated with said electric machine, wherein said power connector communicates with a power driver included in said plug and play controller.

19. The method of claim 18 further comprising:
    forming an integrated connector including said plug and play connector, said sensor connector, and said power connector.

20. The method of claim 12 further comprising:
    updating said plurality of configuration parameters in said memory device with said plug and play controller based on feedback from said sensor.

21. A plug and play system, comprising:
    an electric machine;
    a memory device for storing a plurality of configuration parameters for operating said electric machine;
    a plug and play controller located remote from said electric machine and removably connected to said electric machine, wherein said plug and play controller reads said plurality of configuration parameters from said memory device;
    a plug and play connector that connects to said plug and play controller, wherein said plurality of configuration parameters can be accessed by said plug and play controller;
    a sensor that monitors a property of said electric machine;
    a sensor connector that communicates with said sensor and said plug and play controller; and
    a power connector associated with said electric machine, wherein said power connector communicates with a power driver included in said plug and play controller.

* * * * *